Nov. 27, 1951     D. J. PARMESAN     2,576,355
PULLEY BLOCK ADAPTER DEVICE
Filed Oct. 13, 1948     2 SHEETS—SHEET 1
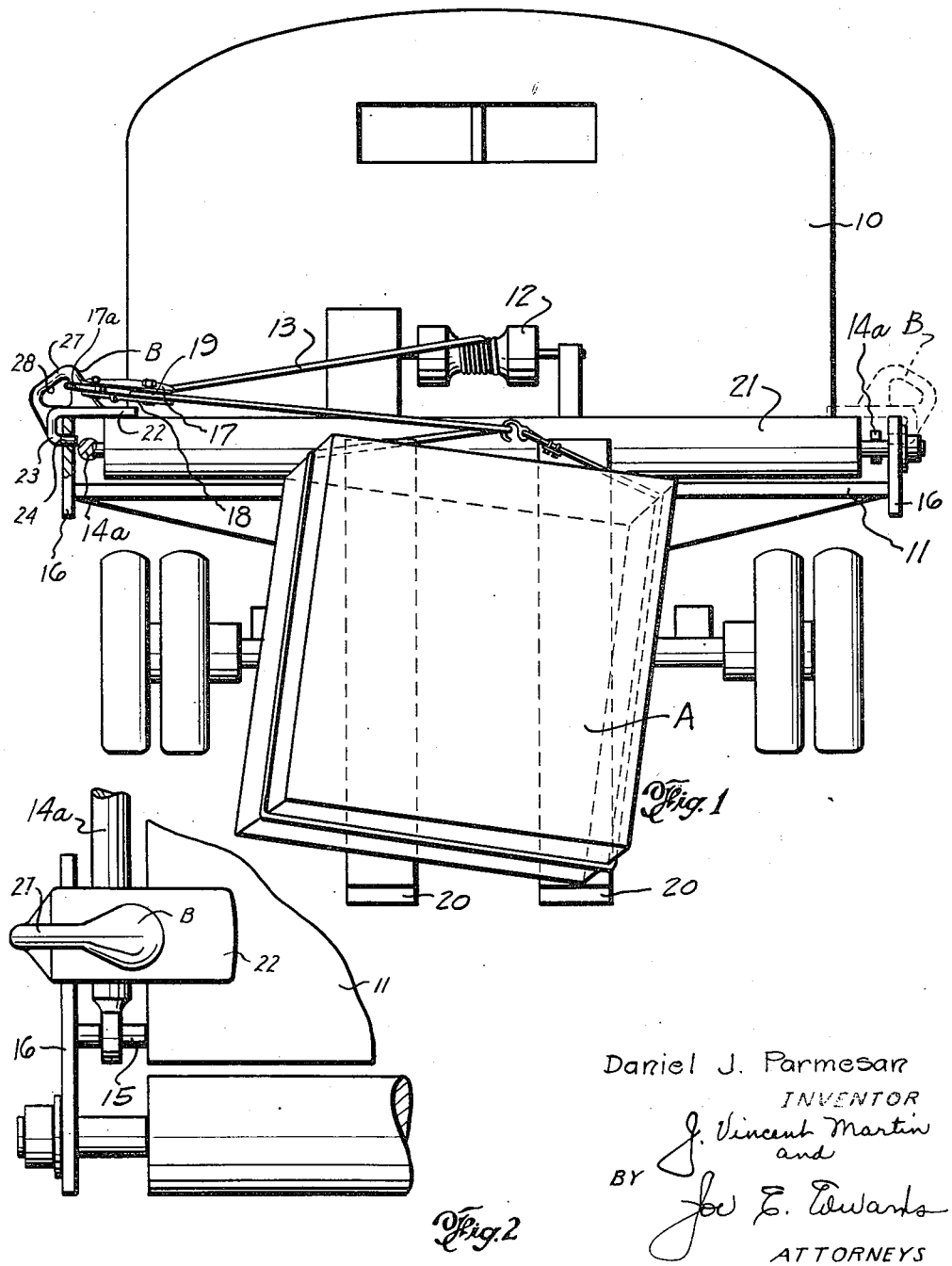
Daniel J. Parmesan
INVENTOR
BY J. Vincent Martin
and
Joe E. Edwards
ATTORNEYS

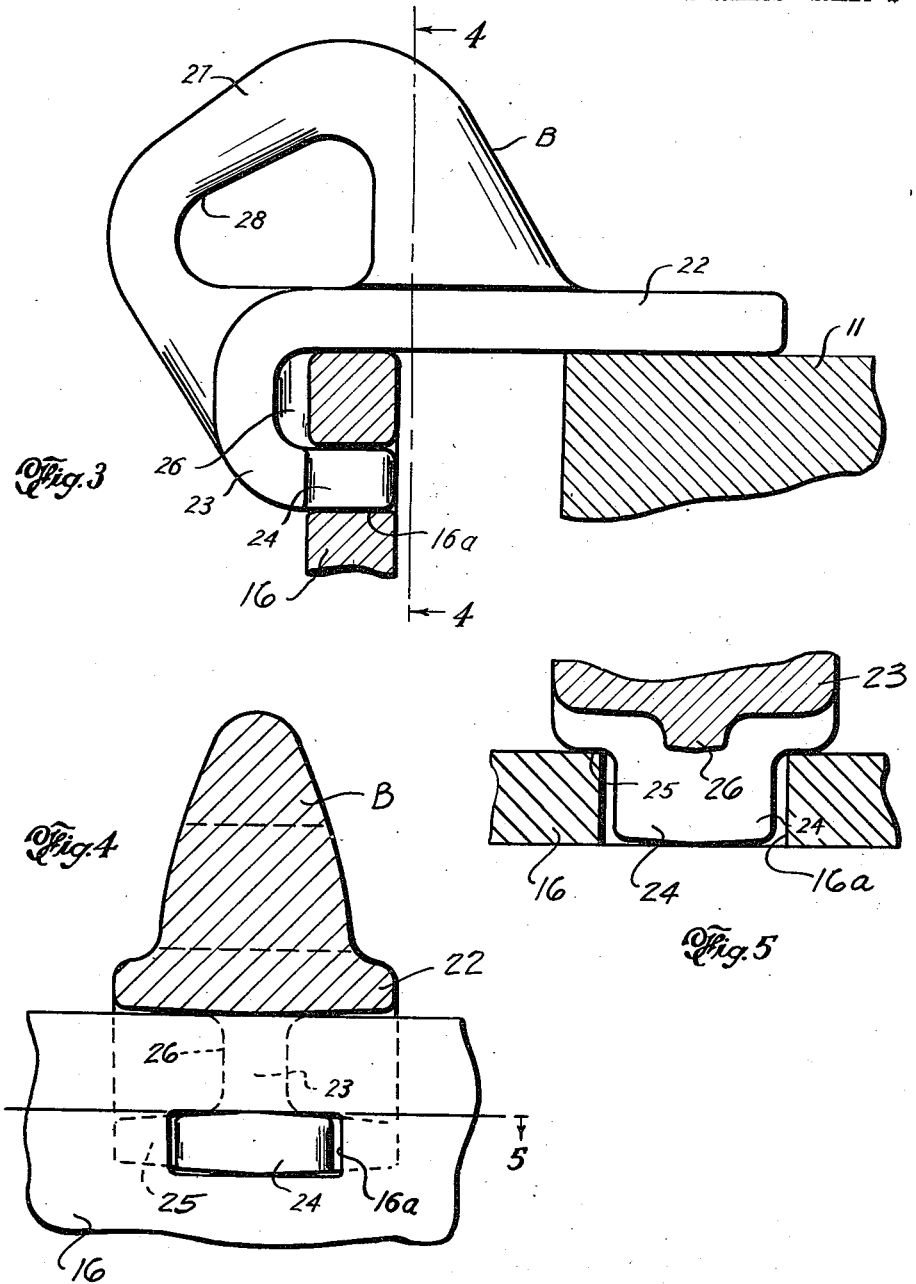

UNITED STATES PATENT OFFICE 2,576,355

PULLEY BLOCK ADAPTER DEVICE

Daniel J. Parmesan, Houston, Tex., assignor to Well Equipment Mfg. Corp., Houston, Tex., a corporation of Texas Application October 13, 1948, Serial No. 54,283

4 Claims. (Cl. 105—369)

This invention relates to new and useful improvements in pulley block adapter devices.

The usual type of heavy hauling vehicle, such as a flat bed truck, is ordinarily provided with a cable or line winch or drum which is generally located behind the truck cab and said cable is utilized to pull heavy loads or objects onto the truck bed. The vehicle is also provided with an A-frame or boom structure pivotally supported on the truck bed. It is general practice to hinge or pivot the lower ends of the A-frame legs to the sides of the truck bed at the rear portion thereof and when said frame is not in use, it may be swung into a substantially horizontal position overhanging the forward end of the bed; when it is desired to use the A-frame, the same is swung rearwardly and in its operating position extends upwardly and rearwardly at an angle overhanging the rear end of the truck bed. A pulley or sheave block, mounted in the apex or top of the frame, has the cable or line from the winch extending thereover and the free end of said cable or line may be attached to the heavy material or object to be loaded. Obviously, by operating the winch, the cable or line may be utilized to pull or lift the material or object onto the truck bed. The cable may extend from the winch and may be attached directly to the load so as to pull the same upwardly on skids or runners or it may be passed over the A-frame pulley and then connected to the load to lift said load, with the particular arrangement which is used being dependent upon the material or object being loaded.

It frequently occurs that when the relatively heavy object or material is pulled upwardly on skids or runners to the level of the truck bed, said object or material is cocked one way or the other and is not centered with respect to the truck bed, with the result that a side pull on the object becomes necessary. The general practice for imparting this side pull through or by means of the winch cable has been to employ a pulley or sheave block having one side of its housing hinged to permit the line to be engaged with the pulley without disconnecting said line from the load. The pulley block is secured to the usual side plate of the truck bed, which forms an outer bearing for the A-frame, by means of a chain or other tie and subsequent operation of the winch imparts the desired side pull to the load to center the same. In addition to straightening loads at the truck bed level, a side pull is many times required for other purposes such as "snaking" or pulling loads from the side of the road to the truck or for skidding the rear end of the truck around sharp turns in order to clear obstacles in rough or difficult terrain. In the latter case, the winch line is passed over the side thrust pulley and attached to a fixed object so that a subsequent pull on the line will skid the rear end of the truck sideways.

The procedure, as now carried out and as above described, is time consuming since considerable time is required to rig up the chain for attachment to the pulley block and after the operation is complete, the chain must be removed because the space between the side plate and truck bed must be kept clear to allow the A-frame to be swung to its operating position. Also, the use of a chain or similar tie is otherwise undesirable because the side thrust pulley is not held as steadily as it should be for efficient operation.

It is, therefore, one object of the present invention to provide an improved adapter device which will facilitate the connection of a side pulley in the draw line or cable of a winch truck or vehicle when an occasion arises demanding a side pull either on a load to be pulled onto the bed of said vehicle or on the rear end of said vehicle itself.

An important object of the invention is to provide an improved adapter device of the character described, which is arranged so that it may be readily connected with and attached to the side plates of the ordinary truck bed, whereby a special mounting structure is not required and also whereby the device may be quickly and easily placed into position when needed and just as quickly removed after the side-pull operation is complete.

A particular object of the invention is to provide an improved adapter device for a side pulley block which device has an amplified flat base or surface arranged to engage and contact the truck bed so that the device will remain in position under heavy strains and will have no tendency to cock or be displaced from its mounted position, whereby the pulley block attached thereto is maintained in a steady, fixed position under all pulley conditions.

Still another object of the invention is to provide an improved adapter device, of the character described, which comprises a relatively flat base having integral means for attaching the same to a truck bed and additional integral means for connecting a pulley block thereto, whereby an extremely simple, yet rugged construction is had.

Other and further objects of the invention will appear from the following description.

The invention will be more readily understood from a reading of the following specification and by reference to the accompanying drawings, wherein an example of the invention is shown, and wherein:

Figure 1 is a rear elevation of a heavy-duty winch truck, illustrating the improved adapter device, constructed in accordance with the invention, mounted on the truck and having a side pulley block attached thereto, Figure 2 is a plan view of the adapter device, Figure 3 is an enlarged view illustrating the device mounted in position on the truck bed with the bed being shown in section, Figure 4 is a vertical, sectional view, taken on the line 4—4 of Figure 3, and Figure 5 is a horizontal cross-sectional view, taken on the line 5—5 of Figure 4.

In the drawings, the numeral 10 designates a heavy-duty truck of usual construction which is provided with a flat bed 11. A cable or line winch or drum 12 which is power operated in the usual manner is mounted on the truck bed 11 and is located adjacent the rear of the truck cab. A cable or line 13 is wound upon the drum or winch 12.

An A-frame (not shown) of usual construction is mounted on the truck bed and has the lower ends of its legs, one of which is indicated at 14a in Figure 2, pivoted or hinged on mounting pins 15 which extend between the sides of the truck bed 11 and flat side plates 16 which are suitably secured to the bed in spaced relation thereto (Figure 2). The pivot or hinge pins 15 which pivotally mount the A-frame or boom structure 14 are located at the rear portion of the truck bed 11, and when the A-frame is not in use, it is ordinarily swung forwardly to a substantially horizontal position over-lying the truck bed. When it is desired to use the A-frame or boom structure, the frame is swung rearwardly and assumes a position extending upwardly and rearwardly over the rear end of the truck.

A pulley or sheave block is usually suspended at the apex or upper end of the truck A-frame or boom structure and when said A-frame has been swung into operating position, the cable or line 13 may be passed over the pulley block with its free end connected to the object or load A which is to be lifted onto the truck bed. Because the legs 14a of the frame are disposed between the side plates 16 and the edge of the truck bed, it is apparent that the space between each side plate and the adjacent edge of the bed must be kept free and clear in order to permit swinging of the A-frame into and out of its operating position.

When it is necessary to impart a side pull either to a load or to the rear end of the truck it is necessary to employ a side thrust pulley block 17 and to attach the same to one rear corner of the truck bed. The cable or line 13 from the winch is passed over the side thrust pulley and has its free end attached to the load, or in the case of skidding the rear end of the truck sideways, to a fixed object, whereby subsequent operation of the winch will exert the desired side pull. As an example, the invention will be described herein as used in loading a heavy object onto the truck bed from the rear end thereof. In this instance, the object or load is pulled upwardly on skids or runners 20 which extent from the rear end of the truck bed downwardly to the ground, the cable 13 extending directly from the drum or winch and being attached to the load, whereby a direct forward pull is obtained. Ordinarily, an elongated roller 21 is mounted in the ends of the side plates 16 and extends transversely across the rear end of the truck bed to facilitate the passage of heavy loads onto said bed.

It freqeuntly occurs that when the relatively heavy object or load A is being pulled upwardly on the skids, it becomes mis-aligned with respect to the skids and center of the truck bed and in order to properly center the same, it is necessary to apply a side pull to said load. The direction of such side pull will, of course, be in accordance with the particular disposition of the load. To facilitate the mounting of the side thrust pulley block 17, whereby a side pull may be exerted upon the load, the improved adapter device B is provided. The device B, which is clearly shown in Figures 3 to 5, includes a relatively broad, flat base plate 22, which has one end extended and bent to form a hook portion 23. The free end of the hook portion is slightly reduced to provide a flat lug 24 and obviously the reduced size of said lug forms a vertical shoulder 25 adjacent the inner end of sail lug. A spacing web or rib 26 is provided within the hook portion 23 extending between the connecting lug 24 and the under side of the base plate 22. It is preferable that the base plate, hook, lug and web all be made integral with each other.

The base plate 22 is adapted to overlie the truck bed 11 (Figure 3), and the flat lug 24 is arranged to engage an opening 16a which is formed in the side plate 16, which, as has been explained, is connected in spaced relation to the side of the bed and forms the outer bearing for the hinge pin 15 of the A-frame structure. It is pointed out that the opening 16a may be readily formed in each side plate 16 and is generally employed for the connection of a chain or other tie-down means for a pulley block which might be needed for exerting a side pull on the load. Thus, the lug 24 is constructed so as to engage within the opening 16a in the usual side plate 16, which plate forms the outer bearing for the A-frame. When the lug is engaged within the opening, as shown in Figure 5, the shoulder 25 as well as the vertical edge of the rib 26 abut the outer surface of the side plate to limit the inward movement of the hook 23 and integral base plate 22. Because of the flat broad undersurface of the base plate 22, as well as due to the firm engagement of the lug 24 within the opening 16a, the base plate is firmly mounted on the truck bed and there is no possibility of said base plate becoming cocked or misaligned after it is once mounted in position.

A fastening eye or loop 27 is preferably made integral with the base plate and hook, with said eye being located at the outer portion of the base plate. The opening 28 within the eye is therefore disposed beyond the vertical edge of the truck bed 11 in a position above the side plate 16. The pulley block 17 has one side of its housing hinged at 18 and a pulley or sheave 19 is mounted therein; a suitable hook 17a is secured to one end of the block. Because one side of the block housing is hinged, it is apparent that the pulley 19 is readily accessible and the cable or line 13 may be engaged around said pulley without disconnecting the end of said cable from the load or object being pulled upwardly from the truck bed.

It is believed that the operation is obvious from the foregoing. The load or object A is initially connected to the free end of the cable or line 13, which usually extends directly from the winch or drum 12 and the object is drawn upwardly along the skids 20 onto the truck bed. In the event that the object or load A is not properly centered upon reaching the level of the truck bed, one of the adapter devices B is mounted at the proper side of the truck bed. As has been pointed out, this mounting is quickly and easily effected by merely sliding the base plate 22 into position overlying the edge portion of the truck bed. Inward sliding of the base plate will cause the hook lug 24 to engage within the opening 16a in the side plate 16. The side thrust pulley block 17 is then connected through the hook 17a with the eye 27 of the device B and a suitable slack is permitted in the cable or line 13 to permit said line to be engaged around the pulley 19 of said block. After such engagement, the housing of the block 17 is properly closed and a subsequent operation of the winch or drum will exert a side pull upon the object or load A. After the object or load has been properly straightened or centered on the skids, the side thrust pulley block may be disconnected from the device B and said device may be quickly and easily removed. It is pointed out that the eye 27 which provides a means for connecting the block 29 to the device B may also be utilized as a handle when mounting or removing said device.

By observing Figure 1, it will be evident that the pull which is exerted through the pulley 19 of the block 17 is transmitted to the inner upper end of the eye 27 and therefore as the cable or line 13 is placed under load, the pull is in a direction which will tend to firmly hold the adapter device B in its mounted position. Because of the flat base plate 22, the block 29 as well as the pulley 19 are maintained in a more or less steady or rigid position, with the result that a more efficient pulling action may be accomplished. The device B is extremely simple in construction and may be mounted on any standard type of heavy-duty truck without making any appreciable change in said truck. Actually the only change which is required is to provide the opening 16a in each side plate 16.

The foregoing description of the invention is explanatory thereof and various changes in the size, shape and materials, as well as in the details of the illustrated construction may be made, within the scope of the appended claims, without departing from the spirit of the invention.

Having described the invention, I claim:

1. An adapter device for mounting a pulley block comprising, a flat relatively wide base plate, a hook element at one end of the base plate, a lug on the free end of the hook element of lesser width than the hook element and base plate and disposed in a plane below the base plate, a reinforcing rib extending between the free end of the hook element and the underside of the base plate and of a lesser lateral projection than the lug on said free end of the hook element, and a connecting eye secured to the upper surface of said base plate.

2. An adapter device for mounting a pulley block including, a flat relatively broad base plate having one end bent to form a hook portion, said hook portion being of the same width as the base plate, a fastening lug formed at the central portion of the extremity of said hook portion and of lesser width than said hook portion, and a connecting eye secured to the upper end of the base plate.

3. The combination with a truck having a flat bed with spaced side plates and an opening in each side plate, of an adapter device including a base plate arranged to overlie the top of one of the truck side plates and the edge portion of the truck bed, a hook portion at one end of the base plate of the same width as said plate and having its free end spaced downwardly from the underside of the base plate, a lug extending laterally from the free end of the hook portion and of a width which is less than the width of said hook portion, said lug being engageable within one of said openings in the truck side plate, and a connecting means on the upper surface of the base plate for connecting a swivel block thereto.

4. The combination with a truck having a flat bed with spaced side plates and an opening in each side plate, of an adapter device including a base plate arranged to overlie the top of one of the truck side plates and the edge portion of the truck bed, a hook portion at one end of the base plate of the same width as said plate and having its free end spaced downwardly from the underside of the base plate, a lug extending laterally from the free end of the hook portion and of a width which is less than the width of said hook portion, said lug being engageable within one of said openings in the truck side plate, a relatively narrow rib extending between the free end of the hook portion and the underside of the base plate, and a connecting eye on the upper surface of the base plate nearer that end of said plate on which the hook portion is formed.

DANIEL J. PARMESAN.

REFERENCES CITED

The following references are of record in the file of this patent:

UNITED STATES PATENTS

| Number | Name | Date |
| --- | --- | --- |
| 118,791 | Calvert | Sept. 12, 1871 |
| 1,317,662 | Foster | Sept. 30, 1919 |
| 2,345,621 | Mothershead | Apr. 4, 1944 |